United States Patent
Park (10) Patent No.: US 7,280,345 B2
(45) Date of Patent: Oct. 9, 2007

(54) CASE FOR DESKTOP COMPUTER

(76) Inventor: Chan-Joon Park, 1317 Yeoksam Venture Tel. 642-1, Yeoksam-dong, Gangnam-Gu, Seoul 135-080 (KR)

( * ) Notice: Subject to any disclaimer, the term of this patent is extended or adjusted under 35 U.S.C. 154(b) by 110 days.

(21) Appl. No.: 10/549,023

(22) PCT Filed: Apr. 1, 2004

(86) PCT No.: PCT/KR2004/000758

§ 371 (c)(1),
(2), (4) Date: Sep. 15, 2005

(87) PCT Pub. No.: WO2004/088485

PCT Pub. Date: Oct. 14, 2004

(65) Prior Publication Data

US 2006/0209500 A1    Sep. 21, 2006

(30) Foreign Application Priority Data

Apr. 2, 2003    (KR) .................. 10-2003-0020707

(51) Int. Cl.
*H05K 7/00* (2006.01)
(52) U.S. Cl. .................................................. 361/679
(58) Field of Classification Search ................. 361/679
See application file for complete search history.

(56) References Cited

U.S. PATENT DOCUMENTS

| | | | | |
|---|---|---|---|---|
| 4,909,579 A | * | 3/1990 | Liu | 312/223.2 |
| 5,051,868 A | * | 9/1991 | Leverault et al. | 361/683 |
| 5,495,389 A | * | 2/1996 | Dewitt et al. | 361/683 |
| 5,561,893 A | * | 10/1996 | Lee | 29/434 |
| 5,600,538 A | * | 2/1997 | Xanthopoulos | 361/683 |
| 5,661,631 A | * | 8/1997 | Crane, Jr. | 361/683 |
| 5,666,264 A | * | 9/1997 | Chandler et al. | 361/683 |
| 5,784,251 A | * | 7/1998 | Miller et al. | 361/683 |
| 5,784,252 A | * | 7/1998 | Villa et al. | 361/683 |
| 5,995,363 A | * | 11/1999 | Wu | 361/679 |
| 6,108,198 A | * | 8/2000 | Lin | 361/683 |
| 6,392,875 B1 | * | 5/2002 | Erickson et al. | 361/683 |
| 6,498,727 B2 | * | 12/2002 | Carr | 361/725 |
| 6,654,236 B2 | * | 11/2003 | Chen et al. | 361/683 |
| 6,711,001 B2 | * | 3/2004 | Hernandez et al. | 361/679 |
| 6,781,842 B2 | * | 8/2004 | Chen et al. | 361/725 |

FOREIGN PATENT DOCUMENTS

| | | | |
|---|---|---|---|
| GB | 2255674 A | * | 11/1992 |
| KR | 90-21517 | | 12/1990 |
| KR | 20-0196739 | | 7/2000 |
| KR | 1020010077032 | | 8/2001 |

* cited by examiner

*Primary Examiner*—Lisa Lea-Edmonds
(74) *Attorney, Agent, or Firm*—IPLA P.A.; James E. Bame (57) ABSTRACT

An object of the present invention is to provide a case for a desktop computer enabling enhanced use of an office area and enhanced utility of a desktop computer. In order to achieve the object, the present invention provides a case for a desktop computer for storing computer parts including a mains board, a power supply (PS), an optical disk drive (ODD), and harddisk (HDD). Such a case for a desktop computer includes a first body for storing at least one computer part of the computer parts, and a second body for storing at least one computer part of the computer parts, wherein an angle between the first and second bodies is adjustable.

13 Claims, 6 Drawing Sheets

CASE FOR DESKTOP COMPUTER

TECHNICAL FIELD

The present invention relates to a case for a desktop computer (usually called a computer vessel).

BACKGROUND ART

As is well known in the art, computers have an important role in modern office circumstances. The majority of computers used for such office circumstances may be grouped as notebook computers that have outstanding mobility, and desktop computers that are fixedly positioned in an office area.

Notebook computers are usually designed to be thin and lightweight in consideration of mobility, and consequently, such design causes high production costs. When compared thereto, desktop computers require a large space for installation due to their volume.

For example, when a computer is put on a desk, the computer consumes working space such that a user may feel inconvenienced, and cables connecting the computer and peripheral devices defile the appearance of the working space.

For such reason, the desktop computer is often set under a desk. However, in such a case, a worker must bend his/her body for access to a USB (universal serial bus) port or an optical disk drive (hereinafter referred to as ODD) such as a CD-ROM and a DVD.

In addition, when maintenance of a computer system is needed, e.g., when a harddisk (hereinafter referred to as HDD) is to be added/replaced, or when an interface card such as a video card or a sound card is to be added/replaced, a case of a computer that has been set under a desk can be opened only after it has been drawn therefrom.

Since a main part of a computer must be moved for such maintenance, cables connected to the computer at its rear side must be provided with a sufficient length. Such marginally lengthy cables clutter the space under a desk, and cause gathering of dust.

CRT monitors once made up the majority of display devices, but flat panel display devices such as LCD monitors are now widely spreading. A flat panel display device enhances utility of an office area since the thickness from its display plane (i.e., front end) to its rear plane (i.e., rear end) is small.

Since such a flat panel display device has a small thickness in comparison with a CRT monitor, it may be positioned rearward on a desk. However, when a flat panel display device is positioned near a far end of a desk, a display panel thereof usually becomes excessively far from the user. Therefore, a flat panel display device is usually positioned on a desk such that it draws back halfway so that available desk area is increased but some marginal space is formed at a rear side of the display device.

It is notable that, although a flat panel display device is thin, it usually consumes a substantial area of a surface of a desk since it requires and is accordingly provided with a stand for holding it.

DISCLOSURE

[Technical Problem]

Therefore, an object of the present invention is to provide a case for a desktop computer enabling enhanced use of an office area and enhanced utility of a desktop computer.

[Technical Solution]

In order to achieve the object, the present invention provides a case for a desktop computer for storing computer parts including a main board, a power supply (PS), an optical disk drive (ODD), and harddisk (HDD). Such a case for a desktop computer includes a first body for storing at least one computer part of the computer parts, and a second body for storing at least one computer part of the computer parts, wherein an angle between the first and second bodies is adjustable.

The first body may stand upright when the first and second bodies are interconnected via a main hinge, and a stopper for limiting a maximum angle between the first and second bodies is formed to at least one of the first and second bodies at an end thereof.

It is preferable that the at least one computer part stored in the first body comprises the main board, and the at least one computer part stored in the second body comprises the ODD. That is, the main board and the ODD are dividedly stored in the first and second bodies.

When the first body stores the main board such that the main board faces opposite to the second body, maintenance becomes advantageous. In this case, when an exterior panel of the first body is capable of being opened, the maintenance becomes more advantageous.

In more detail, in the case in which the first and second bodies are interconnected via a main hinge, and the exterior panel of the first body is capable of being opened by a first hinge, the first hinge may be disposed to at least one place of left and right panels of the first body, and an end of the first body distal from the main hinge.

The exterior panel of the first body is preferably divided by an intermediate hinge.

It is preferable that the exterior panel of the first body is formed such that a length thereof is greater than a length of the main board, and the intermediate hinge is disposed at a position corresponding to an end of the main board.

It is preferable that an anti-slide device is attached to the second body at a panel thereof opposite to the first body, for preventing sliding of the second body.

Maintenance becomes more advantageous when an interior panel of the second body is capable of being opened.

In more detail, the first and second bodies are interconnected via a main hinge, the interior panel of the second body is capable of being opened by a second hinge, the interior panel of the second body is divided into a first interior panel thereof close to the main hinge and a second interior panel thereof distal from the main hinge, and the interior panel of the second body is capable of being opening through the opening of the second interior panel by the second hinge. It is preferable that the second hinge pivotally interconnects the first and second interior panels thereof.

When the interior panel of the second body is supported by side walls of the second body, the strength thereof becomes enhanced.

Inflow of foreign objects such as dust into the second body is prevented when a barrier wall is formed in the second body such that a storage space for computer parts is defined thereby, and a penetration hole is formed at the barrier wall for enabling entrance and exit of cables.

Defiling of appearance by cables exteriorly shown and inflow of foreign objects may be minimized by forming the penetration hole at a position that may be hidden by the exterior panel of the first body when the first and second bodies are maximally spread.

[Advantageous Effects]

According to an embodiment of the present invention, four major components, i.e., a main board, a power supply, an optical disk drive, and a harddisk stored in a computer case are dividedly stored in first and second bodies having an adjustable angle therebetween. Therefore, space consumed by a desktop computer on a desk is efficiently reduced and various layouts of a computer are enabled.

Figure 2:
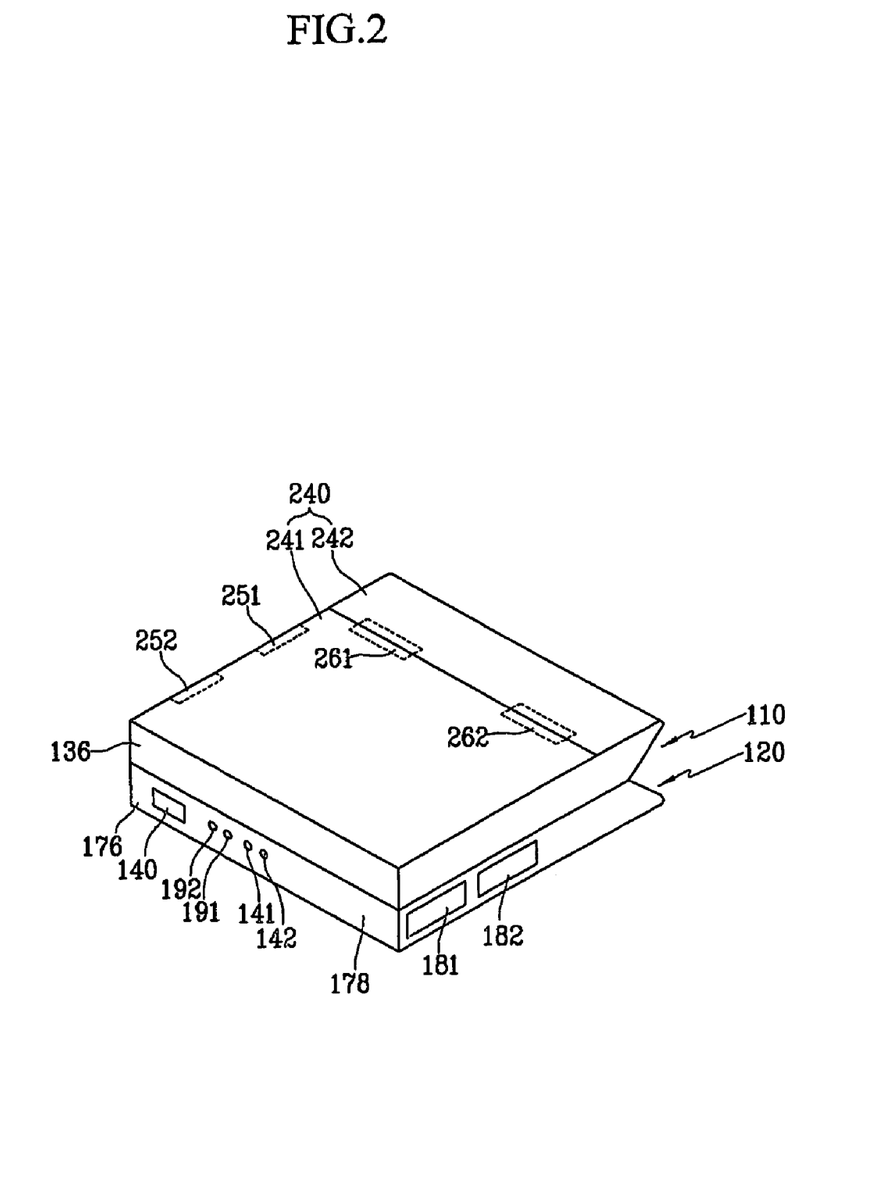
FIG. 2 is a perspective view illustrating an overall exterior shape of a case for a desktop computer according to an embodiment of the present invention at its folded usage.
Figure 6:
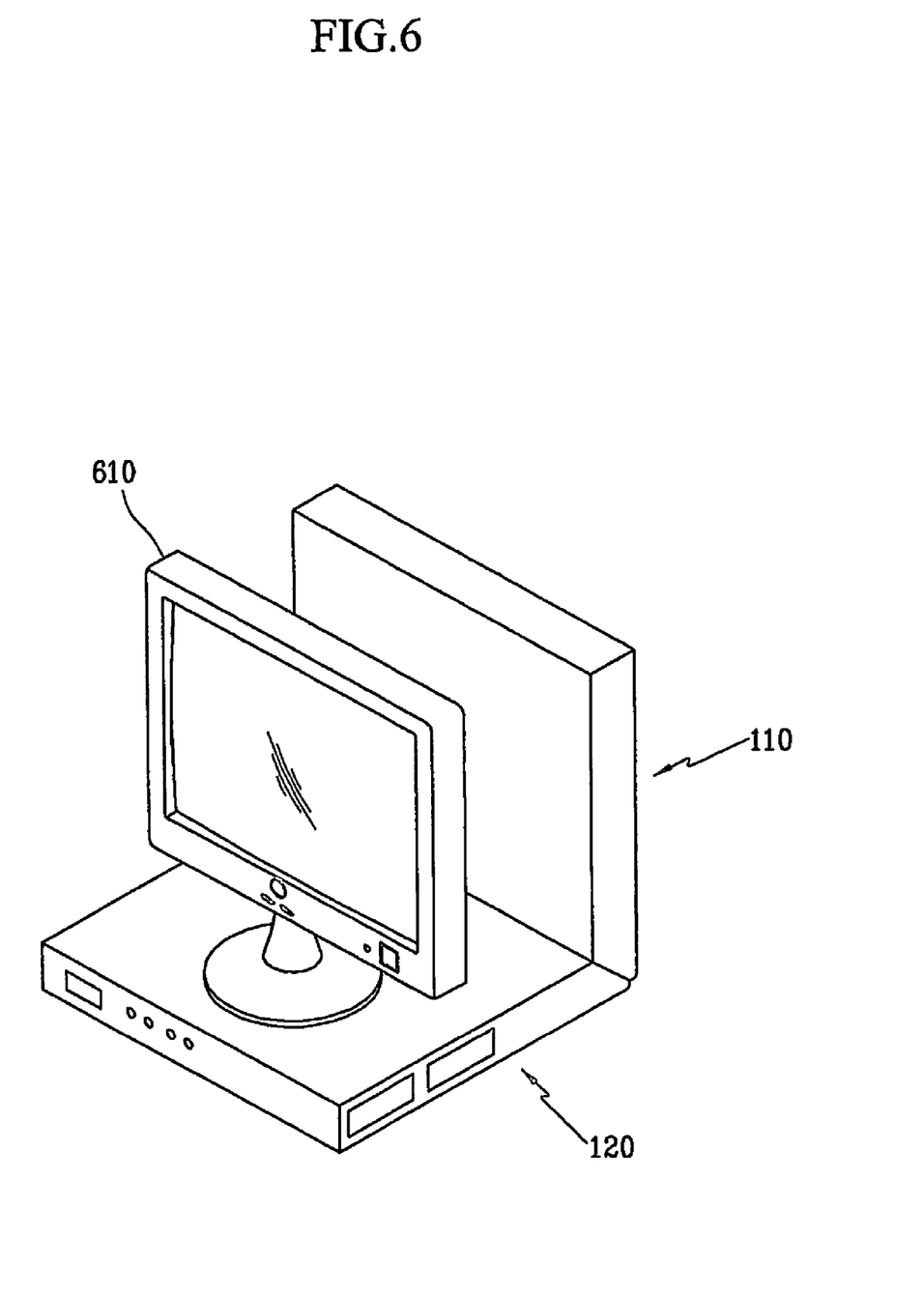
FIG. 6 illustrates an exemplary usage of a case for a desktop computer according to an embodiment of the present invention.

Such a case may be used in a folded shape to form a shape of a conventional desktop computer as shown in FIG. 2, or it may be used in a widely spread fashion as shown in FIG. 6, having an LCD monitor 610 located on its second body. In this case, a desktop computer may be positioned on a desk without consuming substantial work space.

In particular, dividedly storing the main board and the optical disk drive in the first and second bodies enhances utility of such a desktop computer, and increases spatial efficiency of a desktop case.

In addition, maintenance of the computer becomes easy since the main board is stored in the first body (i.e., vertical body) such that it faces opposite to the second body, and since the exterior panel of the first body may be opened. In more detail, the exterior panel of the first body may be fully opened by first hinges located distal from the main hinges connecting the first and second bodies, to allow easy access for replacement/addition of main board accessories (e.g., CPU and various interface cards).

Since the exterior panel of the first body is divided by an intermediate hinge, maintenance becomes more efficient when completely opening of the first body is not required, e.g., in such cases as when a cable needs to be connected externally. Therefore, it is preferable that the exterior panel of the first body is formed such that a length thereof is greater than a length of the main board, and the intermediate hinge is disposed at a position corresponding to an end of the main board.

According to such features of a case, various cables communicating the first and second bodies may be hidden by the first and second bodies when the first and second bodies are spread at a predetermined angle.

Since a stopper for limiting a maximum angle between the first and second bodies is provided near pivotally connected portions of the first and second bodies, the first and second bodies may stably maintain an angle (e.g., 90 degrees) therebetween.

The second body storing the optical disk drive is provided with an anti-slide device for preventing sliding thereof, so the case may stably remain on a desk.

In addition, maintenance may be further enhanced since the interior panel of the second body may be opened. In this case, the interior panel of the second body is divided into two portions such that a distal portion from the main hinge may be opened, and therefore, replacement/addition of an optical disk drive forwardly located in the second body becomes easier. In particular, the divided portions of the second body are pivotally interconnected, and therefore, replacement/addition of an optical disk drive becomes easier.

The utility of such a case for a desktop computer according to an embodiment of the present invention becomes outstanding since it may also be located, in a folded fashion, at a conventional position such as under a desk.

[Best Mode]

A preferred embodiment of the present invention will hereinafter be described in detail with reference to the accompanying drawings.

As is well known in the art, a case for a computer should be able to store a main board (also called a motherboard), a power supply (hereinafter referred to as PS), a harddisk, and an optical disk drive (hereinafter referred to as ODD) such as a CD-ROM. Such four components of a computer are regarded as the four major components thereof and are hereinafter referred to as computer parts.

Figure 1:
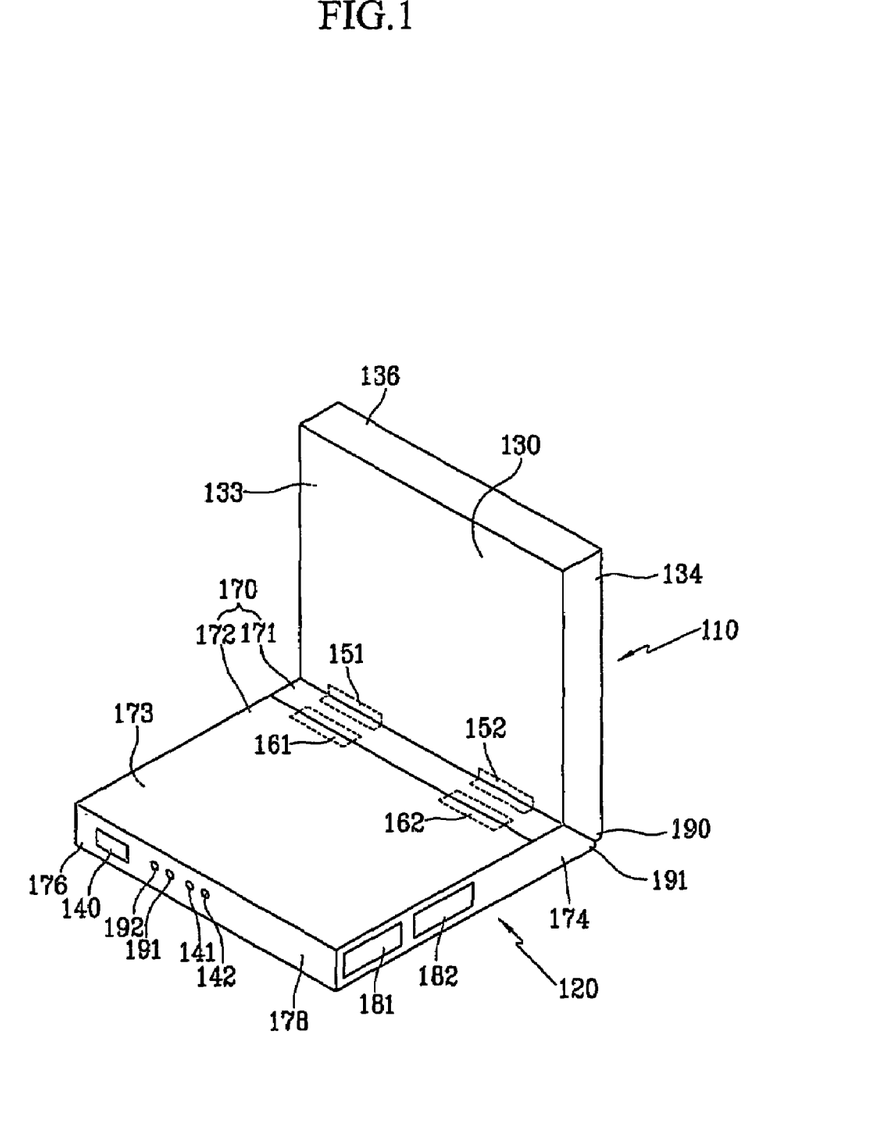
FIG. 1 is a perspective view illustrating an overall exterior shape of a case for a desktop computer according to an embodiment of the present invention at its basic usage.

FIG. 1 is a perspective view illustrating an overall exterior shape of a case for a desktop computer for storing such computer parts according to an embodiment of the present invention.

As shown in FIG. 1, a case for a desktop computer according to an embodiment of the present invention includes a first body 110 for storing at least one computer part of the computer parts and a second body 120 for storing at least one computer part of the computer parts, wherein an angle between the first and second bodies 110 and 120 is adjustable.

That is, at least one of the computer parts is stored in the first body 110 and at least one of the computer parts is also stored in the second body 120, so the computer parts are dividedly stored in the first and second bodies 110 and 120.

In addition, the first and second bodies 110 and 120 are interconnected via hinges 151 and 152 (hereinafter referred to as main hinges) such that the angle between the first and second bodies 110 and 120 becomes adjustable.

Therefore, when the first and second bodies 110 and 120 are folded by the main hinges 151 and 152, a case for a desktop computer of an embodiment of the present invention has an exterior shape as shown in FIG. 2. When the case of an embodiment of the present invention is used in a folded shape as shown in FIG. 2, the computer may be disposed under a desk in the same manner as a conventional case for a desktop computer.

Referring back to FIG. 1, according to a case for a computer of an embodiment of the present invention, the first and second bodies 110 and 120 thereof have a general exterior shape of a rectangular hexahedron.

An exterior panel 240 (refer to FIG. 2) of the first body 110 is longer than an interior panel 130 thereof such that ends of the left and right panels 133 and 134 of the first body 110 become oblique from the main hinges 151 and 152. In the same way, an exterior panel 178 of the second body 120 is longer than an interior panel 170 thereof such that ends of the left and right panels 173 and 174 of the second body 120 become oblique from the main hinges 151 and 152.

Therefore, protruded portions 190 and 191 at such obliquely formed ends of the left and right panels 133, 134, 173, and 174 of the first and second bodies 110 and 120 function as stoppers for limiting a maximum angle between the first and second bodies 110 and 120. Accordingly, as shown in FIG. 1, the second body 120 is laid on a flat area such as a desk, and the first body 110 may remain at a predetermined angle (e.g., 90 degrees) with respect to the second body 120.

A front panel 176 of the second body 120 is provided with a reset switch 142 and a power switch 141 for controlling power supply of the computer, and display devices 191 and 192 for displaying operational status of the computer. The display devices 191 and 192 may be formed as, e.g., an LED 191 for displaying supply of electric power, and an LED 192 for displaying operation of a harddisk (refer to 410 of FIG. 4). In addition, the front panel 176 of the second body 120 is also provided with a USB port 140.

In addition, an LCD display device (not shown) for displaying an operational status of the computer may be adopted in replacement of or in addition to the LEDs 191 and 192.

According to an embodiment of the present invention, items such as the switches 141 and 142, the display devices 191 and 192, and the USB port 140 are exemplarily shown in the drawings and described above to be provided at the front panel 176 of the second body 120. However, it is notable that they may be provided at other places such as the left and right panels 173 and 174, and the interior panel 170.

Figure 3:
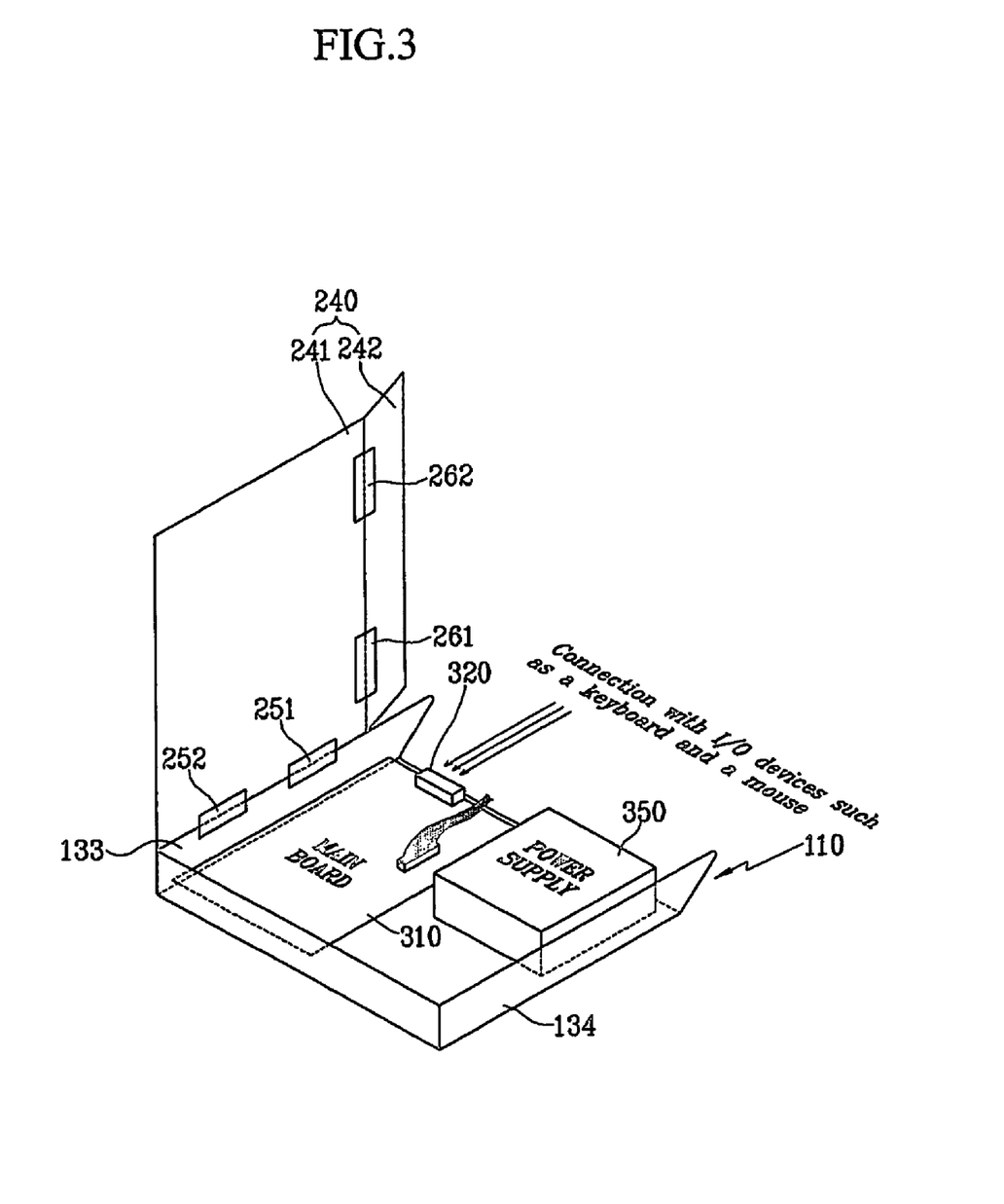
FIG. 3 is a schematic view illustrating a detailed structure of a vertical body of a case for a desktop computer according to an embodiment of the present invention.
Figure 4:
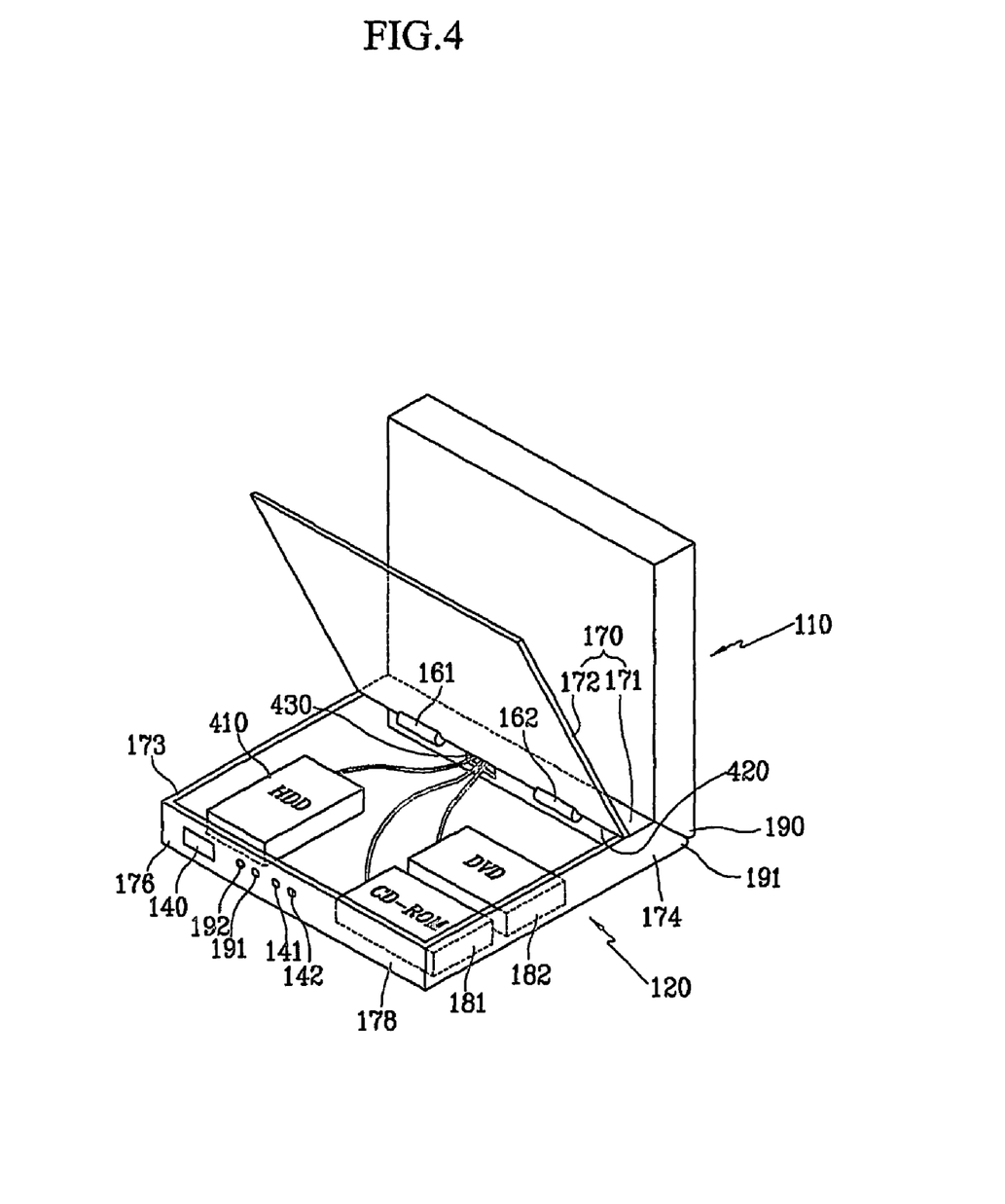
FIG. 4 is a schematic view illustrating a detailed structure of a horizontal body of a case for a desktop computer according to an embodiment of the present invention.

The computer parts are dividedly stored in the first and second bodies 110 and 120, such that the computer may be used with the first and second bodies 110 and 120 folded or opened at 90 degrees. FIG. 3 and FIG. 4 illustrate a preferable disposition of the computer parts.

That is, as shown in FIG. 3, the first body 110 stores a main board 310 and a power supply 350, and the main board 310 is disposed in the first body 110 such that input/output terminal 320 is located rearward (i.e., near the main hinge). In addition, the power supply 350 is disposed such that a terminal for a power cable is located rearward. Therefore, I/O devices and peripheral devices such as a monitor, a keyboard, a mouse, and a printer are connected from rearward of the case, and accordingly cables for connecting such devices are minimally shown to a user of the computer.

As shown in FIG. 4, the second body 120 stores ODDs such as a CD-ROM 181 and a DVD 182, in addition to a harddisk 410.

The ODDs 181 and 182 are stored in the second body 120 that is laid on a desk, for example, for better convenience in usage.

According to an embodiment of the present invention, considering that a peripheral device such as a keyboard will usually be located in front of the second body 120, ODDs 181 and 182 are disposed to face a side panel (e.g., the right panel 174) of the second body 120 such that doors thereof are not blocked from opening. Accordingly, the right panel 174 of the second body 120 is provided with openings of sizes corresponding to ODDs 181 and 182.

However, such a disposition is only an example, and various other dispositions of ODDs should be understood to be included in a protection scope of the present invention. For example, if a door of an ODD is designed to be sufficiently high, it may be opened through the front panel 176 of the second body 120 without interfering with a keyboard.

For better convenience in maintenance of the computer, such as replacement/addition of various interface cards (not shown) acceptable to the main board 310, the first body 110 stores the main board 310 such that the main board 310 faces opposite to the second body 120 when the case for a computer according to an embodiment of the present invention is folded (refer to FIG. 2), and is accessible when the first body 110 is open.

According to a case for a computer according to an embodiment of the present invention, as shown in FIG. 3, an exterior panel 240 is connected to the first body 110 such that it is capable of being opened.

That is, the exterior panel 240 of the first body 110 is connected to the left panel 133 via hinges 251 and 252 (hereinafter referred to as first hinges) disposed therebetween. Therefore, the exterior panel 240 may be opened by the first hinges 251 and 252. An embodiment of the present invention, introduces two of the first hinges, but this should be understood as an example. The protection scope of the present invention should not be understood to be limited the number of the first hinges.

According to an embodiment of the present invention, the first hinges 251 and 252 are formed between the first exterior panel 241 and the left panel 133, but it is obvious that the first hinges 251 and 252 may be formed at other edges (right edge or front side edge) of the first exterior panel 241 to enable opening of the exterior panel 240.

In addition, even though the exterior panel 240 is exemplarily described to be capable of being opened by the first hinges 251 and 252, other opening structures (e.g., an opening structure in which the exterior panel 240 is slidingly extracted from the first body 110) should be understood to be included in the protection scope of the present invention.

The exterior panel 240 of the first body 110 is preferably divided into first and second exterior panels 241 and 242 by intermediate hinges 261 and 262. According to such a dividing structure, the exterior panel 240 of the first body 110 may be either entirely opened or partially opened, i.e., by the second exterior panel 242. Therefore, the exterior panel 240 may be entirely opened using the first hinges 251 and 252 when an entire exposure of the first body 110 is required such as for replacement of an interface card (not shown) on the main board 310 or replacement of the power supply 350, and only the second exterior panel 242 needs to be opened when access to an I/O terminal 320 for peripheral devices is required such as for replacement of a keyboard or for connection of a printer cable, such that easy maintenance may be enabled.

Considering such features, as shown in FIG. 3, a total length of the first body exterior panel 240 is longer than a length of the main board 310, and the intermediate hinges 261 and 262 are formed at a position corresponding to an end of the main board 310.

In the same way that the exterior panel 240 is connected to the first body 110 such that it is capable of being opened for convenience of maintenance, it is preferable that the interior panel 170 is connected to the second body 120 such that it is capable of being opened, as shown in FIG. 4.

According to an embodiment of the present invention, the interior panel 170 of the second body 120 is divided into a first interior panel 171 close to the main hinges 151 and 152, and a second interior panel 172 distal from the main hinges 151 and 152. The first and second interior panels 171 and 172 are interconnected by hinges 161 and 162 (hereinafter referred to as second hinges), such that the second interior panel 172 may be opened by the second hinges 161 and 162.

According to an embodiment of the present invention, the second hinges 162 and 162 are formed between the first and second interior panels 171 and 172, but it is obvious that the second hinges 161 and 162 may be formed at any of the other three edges (left and right edges and front side edge) of the second interior panel 172 to enable opening of the second interior panel 172.

In addition, even though the second interior panel 172 is exemplarily described to be capable of being opened by the second hinges 161 and 162, other opening structures (e.g., an opening structure in which the second interior panel 172 is slidingly extracted from the second body 120) should be understood to be included in the protection scope of the present invention.

According to an embodiment of the present invention, for sufficient strength of the second body 120 to support a peripheral device such as an LCD monitor (not shown) on the interior panel 170 thereof, the interior panel 170 of the second body 120 is formed large enough to overlap the left and right panels 173 and 174 of the second body 120. Therefore, when the interior panel 170 is closed, it is supported by the left and right panels 173 and 174 and thereby sufficient strength is formed to support an object on the interior panel 170.

When a barrier wall (not shown) is further provided in the second body 120, the strength thereof is further enhanced.

The ODDs 181 and 182 and the harddisk 410 stored in the second body 120 should communicate with the main board 310 and should be supplied with power from the power supply 350. Therefore, various data and power cables should be located between the first and second bodies 110 and 120.

It is preferable that such cables between first and second bodies 110 and 120 are minimally exposed to the outside, and that dust and other foreign objects minimally inflow into the second body 120 when it is laid on a desk.

For such features, according to an embodiment of the present invention, a barrier wall 420 is formed inside the second body 120 such that it defines a storage space for computer parts, as shown in FIG. 4. The barrier wall 420 is located under the first interior panel 171 such that the storage space may be maximized.

A penetration hole 430 is formed at the barrier wall 420, for entrance and exit of cables. It is preferable that the penetration hole 430 is located at a position that is hidden by the exterior panel 240 of the first body 110 when the first and second bodies 110 and 120 are maximally spread (i.e., spread by 90 degrees). In that sense, the penetration hole 430 is formed as high as possible, and accordingly, dust and other foreign objects can minimally inflow into the second body 120.

In such a case of an embodiment of the present invention, computer parts may be obviously fastened thereto by a person of ordinary skill in the art. However, a preferable fastening structure of the harddisk 410 and ODDs 181 and 182 is hereinafter described in detail with reference to FIG. 5.

Figure 5:
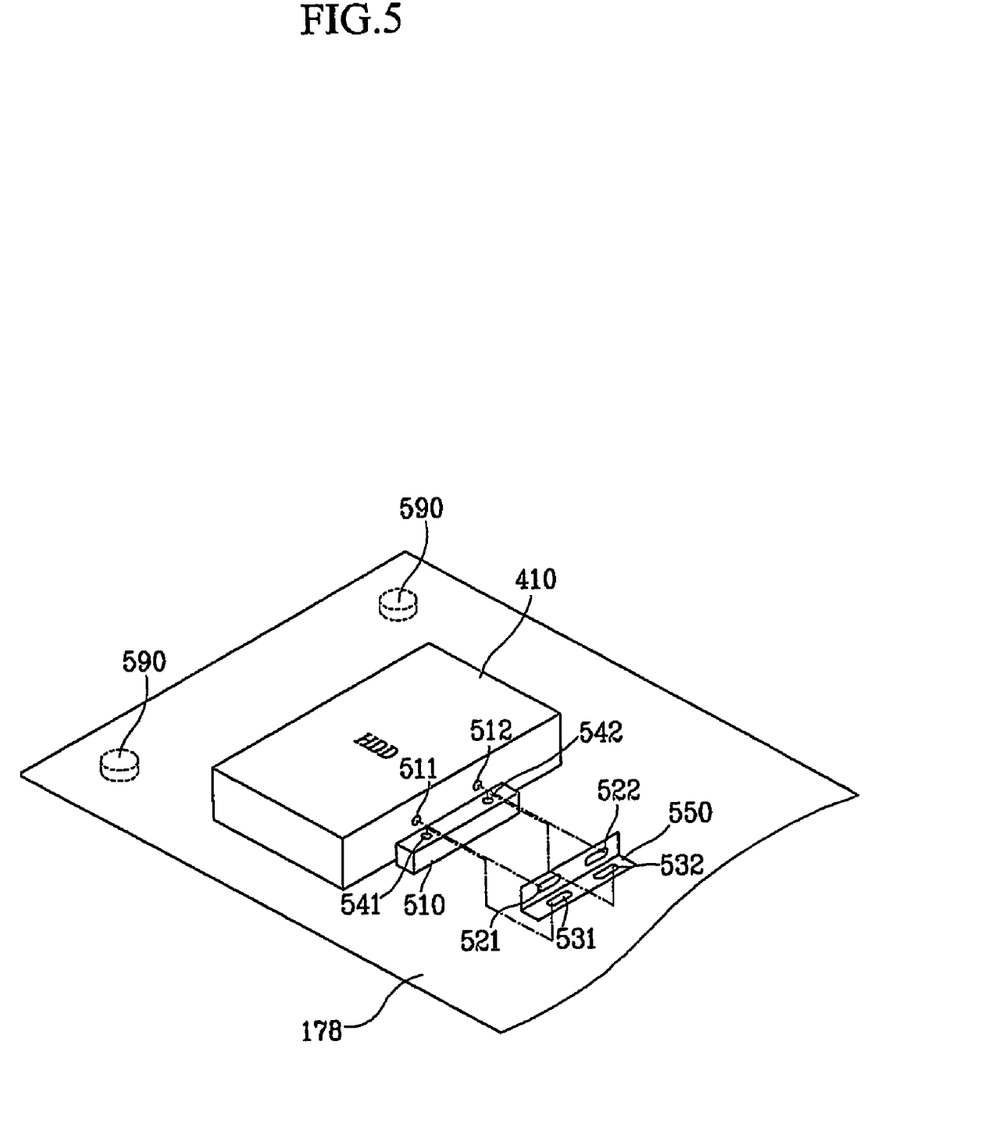
FIG. 5 illustrates how computer parts are fixed to a case for a desktop computer according to an embodiment of the present invention.

FIG. 5 illustrates an exemplary mechanical structure in which the harddisk 410 is fastened to the exterior panel 178 of the second body 120.

Bolt-receiving holes 511 and 512 for receiving fastening bolts are formed to a right side of the harddisk 410. In addition, a projection portion 510 is formed inside the exterior panel 178 of the second body 120, and bolt-receiving holes 541 and 542 for receiving fastening bolts are formed on an upper side of the projection portion 510.

The harddisk 410 is fastened to the projection portion 510 via a vertically bent jig 550. That is, they are fastened together using a jig 550 that has a vertical portion having slots 521 and 522 at positions corresponding to the bolt-receiving holes 511 and 512 of the harddisk 410, and a horizontal portion having slots 531 and 532 at positions corresponding to the bolt-receiving holes 541 and 542 of the projection portion 510.

A left side of the harddisk 410 may be fastened to the second body in the same manner as the right side thereof. The ODDs 181 and 182 may be fastened to the second body in the same manner as the harddisk 410. The power supply 350 in the first body 110 may be fastened thereto in the same manner as the ODDs.

A convenience of a case for a computer according to an embodiment of the present invention is that the second body 120 may be laid on a desk. Therefore, in order to prevent sliding of the second body 120 as a result of a small impact, anti-slide devices 590 are attached to a bottom of the exterior panel 178 of the second body 120 (i.e., to a side of the exterior panel 178 opposite to the first body 110), as shown in FIG. 5.

The anti-slide devices 590 are made of a rubber material, and they are preferably attached under the exterior panel 178 at four corners (two corners shown in FIG. 5 and two other corners corresponding thereto) thereof.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The invention claimed is:

1. A case for a desktop computer for storing computer parts including a main board, a power supply (PS), an optical disk drive (ODD), and a harddisk (HDD), the case comprising:
    a first body for storing at least one computer part of the computer parts, wherein an exterior panel of the first body is capable of being opened; and
    a second body for storing at least one computer part of the computer parts, wherein an angle between the first and second bodies is adjustable.

2. The case as claimed in claim 1, wherein:
    the first and second bodies are interconnected via a main hinge; and
    a stopper for limiting a maximum angle between the first and second bodies is formed to at least one of the first and second bodies at an end thereof.

3. The case as claimed in claim 2, wherein:
    the first body stores the main board such that the main board faces opposite to the second body.

4. The case as claimed in claim 2, wherein a anti-slide device is attached to the second body at a panel thereof opposite to the first body, for preventing sliding of the second body.

5. The case as claimed in claim 2, wherein an interior panel of the second body is capable of being opened.

6. The case as claimed in claim 5, wherein:
    the first and second bodies are interconnected via a main hinge;
    the interior panel of the second body is capable of being opened by a second hinge;
    the interior panel of the second body is divided into a first interior panel thereof close to the main hinge and a second interior panel thereof distal from the main hinge; and the interior panel of the second body is capable of being opened through the opening of the second interior panel by the second hinge.

7. The case as claimed in claim 6, wherein the second hinge pivotally interconnects the first and second interior panels thereof.

8. The case as claimed in claim 2, wherein:
a barrier wall is formed in the second body such that a storage space for computer parts is defined thereby; and
a penetration hole is formed at the barrier wall for enabling entrance and exit of cables.

9. The case as claimed in claim 8, wherein the penetration hole is formed at a position that may be hidden by the exterior panel of the first body when the first and second bodies are maximally spread.

10. The case as claimed in claim 1, wherein:
the at least one computer part stored in the first body comprises the main board; and
the at least one computer part stored in the second body comprises the ODD.

11. The case as claimed in claim 1, wherein:
the first and second bodies are interconnected via a main hinge;
the exterior panel of the first body is capable of being opened by a first hinge; and
the first hinge is disposed to at least one place of left and right panels of the first body, and an end of the first body distal from the main hinge.

12. The case as claimed in claim 1, wherein the exterior panel of the first body is divided by an intermediate hinge.

13. The case as claimed in claim 12, wherein:
the exterior panel of the first body is formed such that a length thereof is greater than a length of the main board; and
the intermediate hinge is disposed at a position corresponding to an end of the main board.

* * * * *